(12) United States Patent
Luo et al.

(10) Patent No.: US 12,424,024 B2
(45) Date of Patent: Sep. 23, 2025

(54) ARTIFICIAL INTELLIGENCE-BASED IDENTITY VERIFICATION METHOD AND APPARATUS, COMPUTER DEVICE, AND STORAGE MEDIUM

(71) Applicant: Tencent Technology (Shenzhen) Company Limited, Shenzhen (CN)

(72) Inventors: Zhao Luo, Shenzhen (CN); Kun Bai, Shenzhen (CN)

(73) Assignee: Tencent Technology (Shenzhen) Company Limited (CN)

( * ) Notice: Subject to any disclaimer, the term of this patent is extended or adjusted under 35 U.S.C. 154(b) by 431 days.

(21) Appl. No.: 17/976,305

(22) Filed: Oct. 28, 2022

(65) Prior Publication Data

US 2023/0063590 A1 Mar. 2, 2023

Related U.S. Application Data

(63) Continuation of application No. PCT/CN2021/119644, filed on Sep. 22, 2021.

(30) Foreign Application Priority Data

Oct. 16, 2020 (CN) .......................... 202011108276.3

(51) Int. Cl.
    *G06V 40/16* (2022.01)
    *G06V 10/82* (2022.01)
(52) U.S. Cl.
    CPC ............ *G06V 40/172* (2022.01); *G06V 10/82* (2022.01)
(58) Field of Classification Search
    CPC ............................ G06V 40/172; G06V 10/82
    See application file for complete search history.

(56) References Cited

U.S. PATENT DOCUMENTS

2019/0026606 A1 1/2019 Hong et al.
2019/0392128 A1* 12/2019 Conde .................. G06V 10/764

FOREIGN PATENT DOCUMENTS

CN 105590043 A 5/2016
CN 108090406 A 5/2018
(Continued)

OTHER PUBLICATIONS

International Search Report and Written Opinion for PCT/CN2021/119644 mailed Dec. 21, 2021 including translation of International Search Report and Written Opinion (14 pages).
(Continued)

*Primary Examiner* — Edward Park
(74) *Attorney, Agent, or Firm* — Crowell & Moring LLP

(57) ABSTRACT

This application relates to an artificial intelligence-based identity verification method and apparatus, a computer device, and a storage medium. The method includes: obtaining a to-be-verified face image inputted into a verification device; performing artificial intelligence-based device tracing processing on the face image, to obtain a photographing device identifier corresponding to a photographing device of the face image; obtaining a verification device identifier corresponding to the verification device; performing feature comparison on the photographing device identifier and the verification device identifier to obtain a comparison result; and performing identity verification based on the face image in a case that the comparison result indicates that the photographing device and the verification device are a same device.

20 Claims, 9 Drawing Sheets

(56) References Cited

FOREIGN PATENT DOCUMENTS

| | | | |
|---|---|---|---|
| CN | 108475331 | A | 8/2018 |
| CN | 109063726 | A | 12/2018 |
| CN | 109086669 | A | 12/2018 |
| CN | 110443014 | A | 11/2019 |
| CN | 110458233 | A | 11/2019 |
| CN | 111291841 | A | 6/2020 |
| CN | 111709930 | A | 9/2020 |
| CN | 111931153 | A | 11/2020 |
| KR | 10-1644268 | | 7/2016 |
| WO | WO 2019/017178 | A1 | 1/2019 |

OTHER PUBLICATIONS

Chinese Office Action for Chinese Patent Application 2020111082763 dated Nov. 18, 2020, including an English Concise Explanation (15 pages).
Office Action issued for European Application 21879214.1, dated Oct. 13, 2023, 8 pages.

\* cited by examiner 256 input nodes

N output nodes

ARTIFICIAL INTELLIGENCE-BASED IDENTITY VERIFICATION METHOD AND APPARATUS, COMPUTER DEVICE, AND STORAGE MEDIUM

RELATED APPLICATION

This application is a continuation of International Application No. PCT/CN2021/119644, filed Sep. 22, 2021, which claims priority to Chinese Patent Application No. 2020111082763, filed with the China National Intellectual Property Administration on Oct. 16, 2020, and entitled "ARTIFICIAL INTELLIGENCE-BASED IDENTITY VERIFICATION METHOD AND APPARATUS, AND COMPUTER DEVICE". The contents of International Application No. PCT/CN2021/119644 and Chinese Patent Application No. 2020111082763 are each incorporated herein by reference in their entirety.

FIELD OF THE TECHNOLOGY

This application relates to the field of computer technologies, and in particular, to an artificial intelligence-based identity verification method and apparatus, a computer device, and a storage medium.

BACKGROUND OF THE DISCLOSURE

With the development of computer technologies, real-name identity verification is used more frequently in service applications and is generally based on face recognition technology. During identity verification, a user uploads a photographed face image through a mobile terminal, and then the face image is compared with an identification photograph of the user, to determine whether the uploaded face image and the identification photograph correspond to a same person, thereby implementing real-name identity verification.

However, in a current online identity verification process, there is a risk that an unreal face image such as a face image stolen from a network is used for verification, which affects the accuracy of identity verification and leads to a potential safety hazard of identity verification.

SUMMARY

According to various embodiments provided in this application, an artificial intelligence-based identity verification method and apparatus, a computer device, and a storage medium are provided.

An artificial intelligence-based identity verification method is provided, the method including:
  obtaining a to-be-verified face image inputted into the verification device;
  performing artificial intelligence-based device tracing processing on the face image, to obtain a photographing device identifier corresponding to a photographing device of the face image;
  obtaining a verification device identifier corresponding to the verification device;
  performing feature comparison on the photographing device identifier and the verification device identifier to obtain a comparison result; and
  performing identity verification based on the face image in a case that the comparison result indicates that the photographing device and the verification device are a same device.

An artificial intelligence-based identity verification apparatus is provided, the apparatus including:
  a face image obtaining module, configured to obtain a to-be-verified face image inputted into a verification device;
  a device tracing processing module, configured to perform artificial intelligence-based device tracing processing on the face image, to obtain a photographing device identifier corresponding to a photographing device of the face image;
  a verification device identifier obtaining module, configured to obtain a verification device identifier corresponding to the verification device;
  an identifier comparison module, configured to perform feature comparison on the photographing device identifier and the verification device identifier to obtain a comparison result; and
  an identity verification processing module, configured to perform identity verification based on the face image in a case that the comparison result indicates that the photographing device and the verification device are a same device.

A computer device is provided, including a memory and one or more processors, the memory storing computer-readable instructions, the computer-readable instructions, when executed by the one or more processors, causing the one or more processors to implement the operations of the foregoing artificial intelligence-based identity verification method.

One or more non-transitory computer readable storage media are provided, storing computer readable instructions, the computer-readable instructions, when executed by one or more processors, causing the one or more processors to perform the operations of the foregoing artificial intelligence-based identity verification method.

A computer-readable program product or a computer-readable program is provided, including computer-readable instructions, the computer-readable instructions being stored in a computer-readable storage medium. A processor of a computer device reads the computer-readable instructions from the computer-readable storage medium and executes the computer-readable instructions, so that the computer device performs the operations of the foregoing artificial intelligence-based identity verification method.

Details of one or more embodiments of this application are provided in the accompanying drawings and descriptions below. Other features, objectives, and advantages of this application become apparent from this specification, the accompanying drawings, and the claims.

BRIEF DESCRIPTION OF THE DRAWINGS

To describe technical solutions in embodiments of this application more clearly, the following briefly introduces accompanying drawings required for describing the embodiments. Apparently, the accompanying drawings in the following description show merely some embodiments of this application, and a person of ordinary skill in the art may still derive other accompanying drawings according to the accompanying drawings without creative efforts.

DESCRIPTION OF EMBODIMENTS

To make objectives, technical solutions, and advantages of this application clearer and more comprehensible, this application is further described in detail with reference to the accompanying drawings and embodiments. It is to be understood that the specific embodiments described herein are only used for explaining this application, and are not used for limiting this application.

Figure 1:
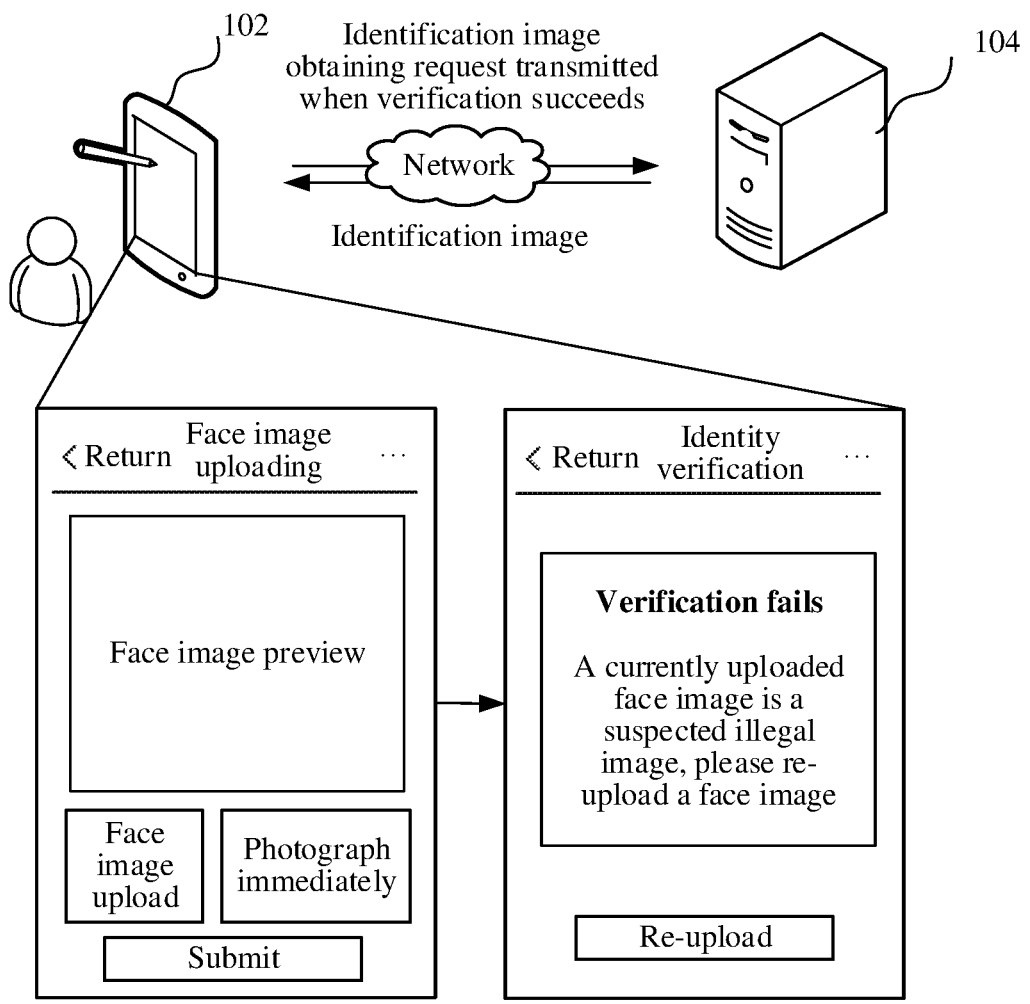
FIG. 1 is a diagram of an application environment of an artificial intelligence-based identity verification method according to an embodiment.

The solutions provided in the embodiments of this application involve applications of technologies such as machine learning of artificial intelligence in an identity verification scenario, and are specifically described through the following embodiments:

An artificial intelligence-based identity verification method provided in this application may be applicable to an application environment shown in FIG. 1. A verification device 102 communicates with a server 104 through a network. A user may upload a face image or photograph a face image in an identity verification interface shown by the verification device 102, to upload the face image to a preview region in the identity verification interface, and after the user confirms the face image displayed in the identity verification interface without any error and submits the face image, the verification device 102 may perform identity verification according to the face image, to ensure an identity of an operating user of the verification device. The verification device 102 may perform image photographing in real time based on a camera component to obtain a face image and display the face image in the identity verification interface, or may upload a face image that is photographed in advance and selected from a system album through images to the identity verification interface for display. The verification device 102 performs artificial intelligence-based device tracing processing on the face image, to obtain a photographing device identifier corresponding to a photographing device of the face image, and determines that the face image inputted into the verification device 102 is authentic when a comparison result of the photographing device identifier and a verification device identifier corresponding to the verification device 102 indicates that the photographing device and the verification device 102 are a same device. The verification device 102 obtains an identification image from a server 104, to perform identity verification based on the identification image and the face image. In event that the comparison result of the photographing device identifier and the verification device identifier corresponding to the verification device 102 indicates that the photographing device and the verification device 102 are different devices, a verification failure verification result is displayed in the identity verification interface, and a prompt message that the currently uploaded face image is a suspected illegal image and please re-upload a face image is displayed. The user may trigger a re-upload control displayed in the identity verification interface to re-upload a face image, to perform identity verification again.

In addition, the identification image for identity verification may also be directly inputted into the verification device 102, so that the verification device 102 independently implements the artificial intelligence-based identity verification method. In addition, the server 104 may also perform identity verification. That is, the server 104 obtains the face image inputted into the verification device 102, performs artificial intelligence-based device tracing processing on the face image, and performs feature comparison on the photographing device identifier corresponding to the photographing device of the obtained face image and the verification device identifier of the verification device. When the photographing device of the face image is determined to be the verification device, the server 104 performs identity verification based on the face image and an identification image, where the identification image may be obtained by the server 104 from a local database or may be obtained by the server 104 from the verification device 102.

The verification device 102 may be, but not limited to, a personal computer, a notebook computer, a smartphone, a tablet computer, and a portable wearable device. The server 104 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform. The verification device may be a smartphone, a tablet computer, a notebook computer, a desktop computer, a smart speaker, a smart watch, or the like, but is not limited thereto. The verification device 102 and the server 104 may be directly or indirectly connected in a wired or wireless communication manner. This is not limited in this application.

Figure 2:
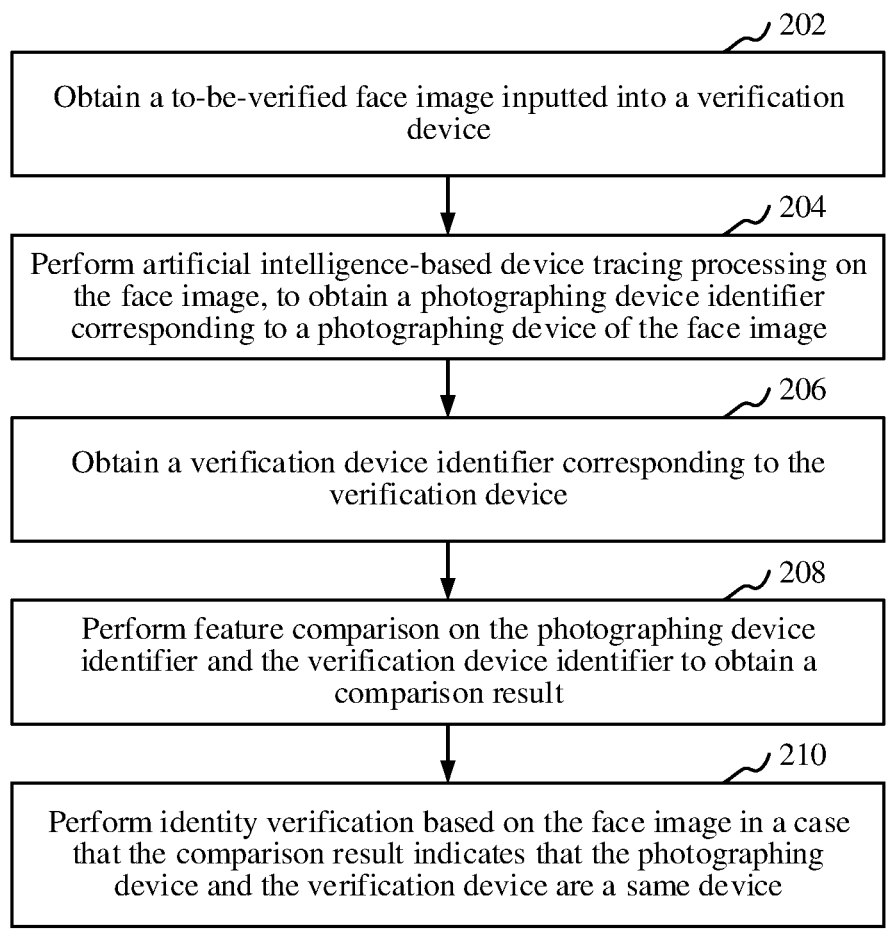
FIG. 2 is a schematic flowchart of an artificial intelligence-based identity verification method according to an embodiment.

In an embodiment, as shown in FIG. 2, an artificial intelligence-based identity verification method is provided. Using an example in which the method is applicable to the verification device shown in FIG. 1, the method includes the following steps:

Step 202: Obtain a to-be-verified face image inputted into a verification device.

The verification device may be a terminal device on which the user initiates identity verification, and the face image is a to-be-verified picture including a face part of a user. For example, the face image may be a face photograph of a user whose identity needs to be verified, so that identity verification may be performed based on the face image, to determine whether the face image is consistent with an identification image, thereby implementing real-name authentication.

Specifically, the verification device obtains an inputted to-be-verified face image photographed in real time or uploaded locally in an entered identity verification interface. The face image may be photographed by the verification device, or may not be photographed by the verification device but stolen from a network. If the face image is stolen from the network and inputted into the verification device, if identity verification is performed based on the face image, the safety of identity verification has a risk, and the accuracy of identity verification is limited.

Figure 3:
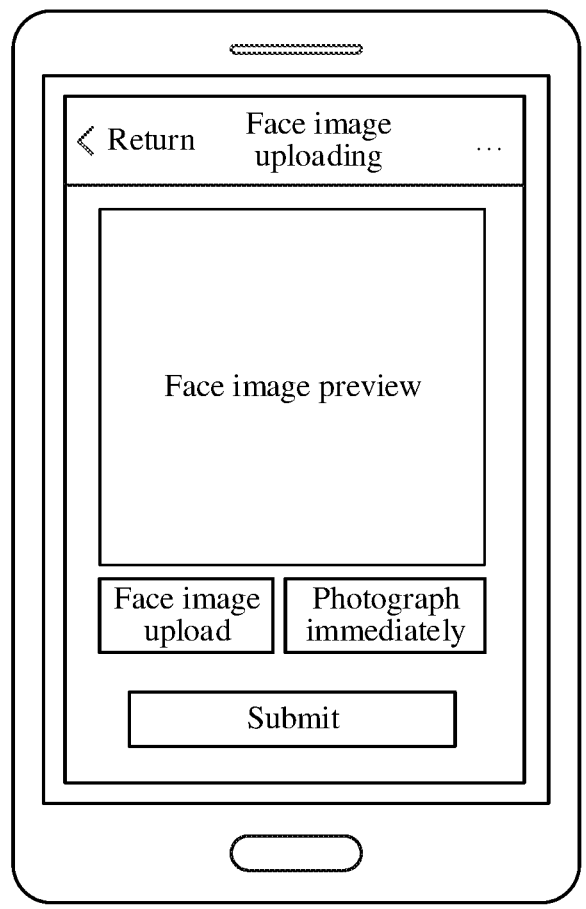
FIG. 3 is a schematic interface diagram of an identity verification interface according to an embodiment.

During a specific implementation, as shown in FIG. 3, in a normal use scenario, the user may upload a face image or photograph a face image in the identity verification interface where the verification device enters, to upload the face image to a preview region of the identity verification interface, and after the face image is confirmed without any error and submitted, identity verification may be performed according to the face image, to ensure an identity of an operating user of the verification device. In FIG. 3, when identity verification needs to be performed on the user, a face image upload page is displayed in the verification device, and a face image preview region, an immediate photographing control, a face image upload control, and a submit control for a confirmed face image are displayed in the face image upload page. When the immediate photographing control is triggered, a camera may be invoked to perform face image photographing, and a photographed face image is displayed in the face image preview region. When the face image upload control is triggered, a candidate image selection page may be jumped to, and a selected image is displayed in the face image preview region. When a face image is displayed in the face image preview region, whether the face image submit control may be triggered is determined, to perform identity verification on the displayed face image. In the normal use scenario, if the user triggers the verification device to perform photograph photographing through the immediate photographing control, the verification device displays a photograph currently photographed by the verification device in the preview region. In this case, subsequent processes may be performed continuously, to perform identity verification based on the currently photographed photo. If the user triggers face image uploading through the face image upload control, a face image may be selected from images locally stored by the verification device and displayed in the preview region. In this case, if the selected face image is not photographed by the verification device, for example, is obtained from a network, the face image cannot pass identity verification after subsequent processes are performed. In an illegal use scenario, a hacker may input an illegally obtained photograph into the verification device through some computer invasion methods, to attempt to use the photograph to pass subsequent identity verification. However, by adopting the solution provided in this application, the hacker cannot successfully pass identity verification in this illegal use scenario.

Step 204: Perform artificial intelligence-based device tracing processing on the face image, to obtain a photographing device identifier corresponding to a photographing device of the face image.

Device tracing refers to a process of tracing a photographing device of an image, for example, determining a type of a device photographing a picture; or determining a photographing device photographing the picture in photographing devices of a same type. By performing device tracing processing on the face image, a photographing device of the face image may be determined, for example, a photographing device identifier corresponding to the photographing device of the face image may be obtained. The photographing device identifier is used for distinguishing various photographing devices. For example, the photographing device identifier may be information that can be used for distinguishing photographing devices such as an identity document (ID) of the photographing device or a feature of the photographing device.

Specifically, after the to-be-verified face image is inputted into the verification device, the verification device performs device tracing processing on the face image based on an artificial intelligence technology such as a pre-trained neural network model, to obtain the photographing device identifier corresponding to the photographing device of the face image. Photographing devices corresponding to different images may be distinguished according to the photographing device identifier, so that a photographing source of the face image is determined.

Step 206: Obtain a verification device identifier corresponding to the verification device.

The verification device identifier is used for distinguishing various verification devices, different verification devices correspond to different verification device identifiers, and the verification device identifier specifically may be information that can be used for distinguishing devices such as a pattern noise feature of the verification device or a character string obtained through mapping of the pattern noise feature. Pattern noise is an intrinsic attribute of a device including a photographing function. Specifically, a light sensing surface of a sensor of a common camera is formed by lithographic units that can store signal charges. Due to the nonuniformity of the lithographic units for light sensing and the shortage of a camera sensor manufacturing process, each camera has system noise, namely, pattern noise, the pattern noise of each camera is different, but there is a one-to-one correspondence between each camera and the pattern noise, which differs according to each camera and is similar to a fingerprint feature of each person. Therefore, a pattern noise feature reflecting the pattern noise may also be used as an identifier of each device, to distinguish various devices including a photographing function. The verification device may map the pattern noise feature into a character string with stronger readability by performing mapping processing on the pattern noise feature according to a specific mapping rule, and the character string may be used as a verification device identifier to distinguishing various verification devices through the character string.

Specifically, the verification device further obtains a verification device identifier corresponding to the verification device. During a specific implementation, the verification device identifier corresponding to the verification device may be stored in device attribute information, so that the verification device identifier is extracted from the device attribute information. In addition, the verification device identifier may also be obtained by performing artificial intelligence-based device tracing processing on an image photographed by the verification device. In a specific application, the verification device performs artificial intelligence-based device tracing processing on the face image, determines the photographing device identifier corresponding to the photographing device of the face image based on a first pattern noise feature obtained through the device tracing processing, queries the device attribute information of the verification device, and extracts the verification device identifier determined based on a second pattern noise feature corresponding to the verification device from the device attribute information.

Step 208: Perform feature comparison on the photographing device identifier and the verification device identifier to obtain a comparison result.

After the photographing device identifier corresponding to the photographing device of the face image and the verification device identifier of the verification device are obtained, the verification device compares the photographing device identifier and the verification device identifier, for example, performs feature comparison on character strings obtained after mapping is performed on pattern noise features of the devices, or perform feature comparison on the pattern noise features, to obtain a comparison result. The comparison result of the feature comparison reflects a relationship between the photographing device of the face image inputted into the verification device and the verification device, and the verification device may determine whether the face image inputted into the verification device is photographed by the verification device according to the comparison result. Step 210: Perform identity verification based on the face image in a case that the comparison result indicates that the photographing device and the verification device are a same device.

After the comparison result is obtained by the verification device, when the comparison result indicates that the photographing device and the verification device are a same device, for example, the photographing device identifier and the verification device identifier are the same, it may be determined that the face image inputted into the verification device is photographed by the verification device. The verification device performs identity verification based on the face image, for example, specifically may perform face comparison on the face image and a verification standard image, to obtain an identity verification result. The verification standard image is a reference image used for identity verification, such as an identification photograph of the user. In addition, when the comparison result indicates that the photographing device and the verification device are different devices, that is, the face image inputted into the verification device is not photographed by the verification device, there is a risk that the face image is an image stolen from a network. In this case, identity verification may not be performed, or an identity verification failure verification result may be obtained, to prompt the user of the verification device to resubmit a real face image including credibility, so that the authenticity and reliability of the face image on which identity verification is performed are ensured, the accuracy of identity verification is improved, and the safety of identity verification is ensured.

In the foregoing artificial intelligence-based identity verification method, artificial intelligence-based device tracing processing is performed on the face image inputted into the verification device, the photographing device identifier corresponding to the photographing device of the face image is obtained, when the comparison result of the photographing device identifier and the verification device identifier of the verification device indicates that the photographing device and the verification device are the same device, the face image inputted into the verification device is determined to be authentic, and identity verification is performed based on the face image. Artificial intelligence-based device tracing processing on the face image inputted into the verification device, feature comparison is performed on the obtained photographing device identifier corresponding to the photographing device of the face image and the verification device identifier of the verification device, and when the photographing device of the face image is determined to be the verification device, identity verification is performed based on the face image, so that the authenticity and reliability of the face image inputted into the verification device are ensured, the accuracy of identity verification performed based on the face image is improved, and the safety of identity verification is ensured.

In an embodiment, the photographing device identifier is obtained based on a first pattern noise feature extracted from the face image, and the verification device identifier is obtained based on a second pattern noise feature corresponding to the verification device; and the performing feature comparison on the photographing device identifier and the verification device identifier to obtain a comparison result includes: determining a similarity between the first pattern noise feature and the second pattern noise feature; and obtaining the comparison result of the photographing device identifier and the verification device identifier according to the similarity.

The first pattern noise feature is extracted from the face image inputted into the verification device, specifically, may be extracted by performing device tracing processing on the face image. The first pattern noise feature reflects pattern noise of the photographing device of the face image, and the first pattern noise feature may be used as the photographing device identifier of the photographing device, to accurately distinguish various devices. Similarly, the second pattern noise feature reflects pattern noise of the verification device. The second pattern noise feature may be extracted by performing device tracing processing on an image photographed by the verification device. The similarity represents a degree of similarity between the photographing device of the face image and the verification device, and a higher similarity indicates that the photographing device of the face image is more similar to the verification device, and the face image is more likely to be photographed by the verification device.

Specifically, the photographing device identifier may include the first pattern noise feature extracted from the face image, and the verification device identifier may include the second pattern noise feature corresponding to the verification device. When the photographing device identifier and the verification device identifier are compared, the verification device may obtain a similarity between the photographing device identifier and the verification device identifier according to the similarity between the first pattern noise feature and the second pattern noise feature, and obtain the comparison result of feature comparison performed on the photographing device identifier and the verification device identifier according to the similarity between the photographing device identifier and the verification device identifier. The determining a similarity between the first pattern noise feature and the second pattern noise feature specifically may be determining a cosine similarity between the first pattern noise feature and the second pattern noise feature, where the cosine similarity measures the similarity between the two parties by calculating a cosine value of an angle between the first pattern noise feature and the second pattern noise feature. After the similarity between the first pattern noise feature and the second pattern noise feature is obtained, the verification device obtains the comparison result of the photographing device identifier and the verification device identifier based on the similarity. Specifically, the verification device may compare the similarity with a preset similarity threshold. In a case that the similarity exceeds the similarity threshold, it is considered that the similarity between the first pattern noise feature and the second pattern noise feature is relatively high, and the photographing device of the face image and the verification device are the same device; or otherwise, the photographing device of the face image and the verification device are different devices.

In this embodiment, the degree of similarity between the photographing device of the face image and the verification device is measured through the similarity between the first pattern noise feature and the second pattern noise feature, and the comparison result of the photographing device identifier and the verification device identifier may be obtained. Therefore, accurate device tracing may be performed on the face image by effectively using the intrinsic pattern noise feature of the device including a photographing function, the authenticity and reliability of the face image are accurately determined, and the accuracy of identity verification is ensured.

In an embodiment, the obtaining the comparison result of the photographing device identifier and the verification device identifier according to the similarity includes: obtaining a comparison result indicating that the photographing device and the verification device are the same device when the similarity is greater than the similarity threshold; and obtaining a comparison result indicating that the photographing device and the verification device are different devices when the similarity is less than or equal to the similarity threshold.

In this embodiment, according to a magnitude relationship between the similarity between the first pattern noise feature and the second pattern noise feature and the preset similarity threshold, a comparison result indicating a relationship between the photographing device and the verification device is determined. The similarity threshold may be flexibly set according to an actual requirement, for example, may be set to 80%.

Specifically, after the similarity between the first pattern noise feature and the second pattern noise feature is obtained, the verification device obtains the preset similarity threshold, and compares the similarity with the similarity threshold. In event that the similarity is greater than the similarity threshold, the degree of similarity between the photographing device and the verification device is relatively high, and it may be considered that the photographing device of the face image and the verification device are the same device. That is, the face image inputted into the verification device is photographed by the verification device, so that a comparison result indicating that the photographing device and the verification device are the same device is obtained. In event that the similarity is less than or equal to the similarity threshold, it indicates that the degree of similarity between the photographing device and the verification device is relatively low, and it may be considered that the photographing device of the face image and the verification device are different devices. That is, the face image inputted into the verification device is not photographed by the verification device but photographed by another device, which may be a face image illegally stolen from a network, so that a comparison result indicating that the photographing device and the verification device are different devices is obtained.

In this embodiment, the comparison result is determined according to a magnitude relationship between the similarity between the first pattern noise feature and the second pattern noise feature and the preset similarity threshold. Therefore, accurate device tracing may be performed on the face image by effectively using the intrinsic pattern noise feature of the device including a photographing function, the authenticity and reliability of the face image are accurately determined, and the accuracy of identity verification is ensured.

Figure 4:
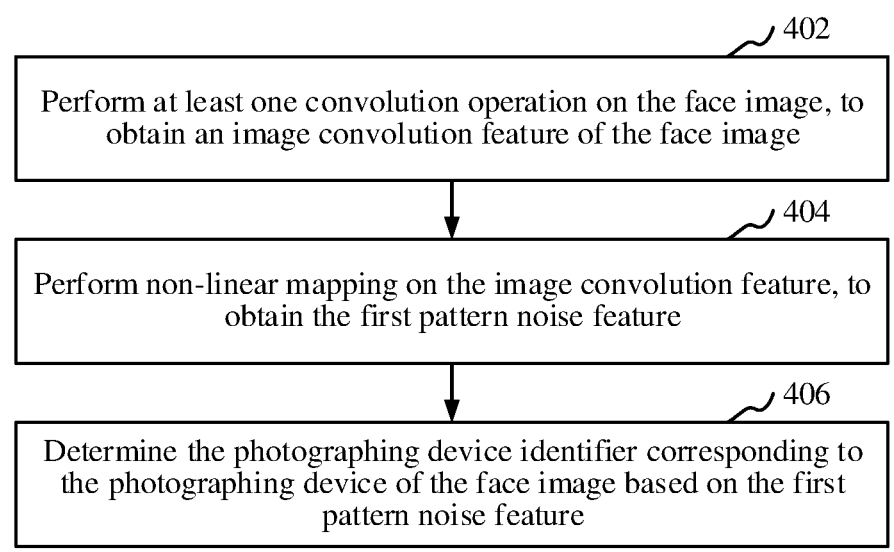
FIG. 4 is a schematic flowchart of device tracing processing according to an embodiment.

In an embodiment, as shown in FIG. 4, the performing artificial intelligence-based device tracing processing on the face image, to obtain a photographing device identifier corresponding to a photographing device of the face image includes:

Step 402: Perform at least one convolution operation on the face image, to obtain an image convolution feature of the face image.

The convolution operation may be implemented by a convolution layer of a convolutional neural network model, to perform feature extraction on the face image to obtain the image convolution feature of the face image. The convolution layer of the convolutional neural network model is formed by several convolution units, and a parameter of each of the convolutional units is optimized through a back-propagation algorithm. An objective of convolutional operation is to extract inputted different features. The first convolution layer can only extract some low-level features, for example, levels such as edges, lines, and angles, and a network with more layers can iteratively extract more complex features from the low-level features. By performing at least one convolution operation on the face image, the image convolution feature related to the pattern noise of the corresponding photographing device may be extracted from the face image.

Specifically, when the verification device or the server performs device tracing processing on the face image, at least one convolution operation is performed on the face image to obtain the image convolution feature, where the image convolution feature may represent the pattern noise of the photographing device of the face image.

Step 404: Perform non-linear mapping on the image convolution feature, to obtain the first pattern noise feature.

After the image convolution feature of the face image is obtained, the verification device or the server performs non-linear mapping on the image convolution feature. Specifically, the verification device or the server may first perform pooling processing on the image convolution feature, and then perform non-linear mapping on an output result of the pooling through an excitation function, to obtain the first pattern noise feature representing the pattern noise of the photographing device of the face image.

Step 406: Determine the photographing device identifier corresponding to the photographing device of the face image based on the first pattern noise feature.

After the first pattern noise feature is obtained, the verification device or the server determines the photographing device identifier corresponding to the photographing device of the face image based on the first pattern noise feature. For example, the verification device or the server may directly use the obtained first pattern noise feature as the photographing device identifier corresponding to the photographing device of the face image, or may perform label mapping on the first pattern noise feature, for example, perform label mapping through a fully-connected layer, to map the first pattern noise feature to a corresponding character string, obtain a device ID label according to the character string, and use the obtained device ID label as the photographing device identifier.

In this embodiment, feature extraction is sequentially performed on the face image through the at least one convolution operation, non-linear mapping is performed on the extracted image convolution feature, and the photographing device identifier corresponding to the photographing device of the face image is determined based on the obtained first pattern noise feature. Therefore, device tracing processing is performed on the face image based on artificial intelligence, the accuracy of device tracing can be effectively improved, and the accuracy of identity verification is ensured.

In an embodiment, the determining the photographing device identifier corresponding to the photographing device of the face image based on the first pattern noise feature includes: map the first pattern noise feature into a character string according to a device identifier format, to obtain the photographing device identifier corresponding to the photographing device of the face image.

In this embodiment, the first pattern noise feature is mapped into a character string, and the photographing device identifier corresponding to the photographing device of the face image is obtained according to the obtained character string. Specifically, after the first pattern noise feature corresponding to the face image is obtained, the verification device queries a preset device identifier format. The device identifier format defines a mapping rule for mapping a pattern noise feature into a character string, and the pattern noise feature may be mapped into a character string with stronger readability according to the device identifier format. Pattern noise features correspond to different character strings, so that the character string may be used as an identifier of a corresponding device. After the device identifier format is determined, the verification device maps the first pattern noise feature into a character string according to the device identifier format, and obtains the photographing device identifier corresponding to the photographing device of the face image according to the character string, for example, directly uses the character string as the photographing device identifier.

Further, the performing feature comparison on the photographing device identifier and the verification device identifier to obtain a comparison result includes: performing character comparison on the photographing device identifier and the verification device identifier to obtain the comparison result.

In event that the photographing device identifier and the verification device identifier include character strings obtained through mapping processing according to the device identifier format and feature comparison is performed on the photographing device identifier and the verification device identifier, the verification device may perform character comparison on the photographing device identifier and the verification device identifier, for example, may perform comparison on characters in the character strings one by one to obtain the comparison result. Specifically, the verification device queries the preset device identifier format, maps the first pattern noise feature and the second pattern noise feature into corresponding character strings according to the mapping rule defined by the device identifier format, obtains a character comparison result of the photographing device identifier and the verification device identifier according to the comparison result of the mapped character strings respectively corresponding to the first pattern noise feature and the second pattern noise feature, and obtains the comparison result of feature comparison performed between the photographing device identifier and the verification device identifier according to the character comparison result. In event that respective corresponding characters are the same during character comparison, it may be determined that the photographing device of the face image and the verification device are the same device, or otherwise, the photographing device of the face image and the verification device are different devices.

In this embodiment, the verification device maps a pattern noise feature into a character string according to the device identifier format, so that the readability of the photographing device identifier and the verification device identifier may be improved. Meanwhile, by performing character comparison on the character string corresponding to the photographing device identifier and the character string corresponding to the verification device identifier, the photographing device identifier and the verification device identifier may be accurately compared to obtain an accurate comparison result, so that the accuracy of identity verification is ensured.

In an embodiment, the device tracing processing is implemented based on a device tracing network model, the device tracing network model is generated through model training operations, and the model training operations include: obtaining a training image carrying a device identifier label; performing at least one convolution operation on the training image through a to-be-trained device tracing network model, to obtain a training convolution feature of the training image; performing non-linear mapping on the training convolution feature through the device tracing network model, to obtain a training pattern noise feature; determining a prediction device identifier corresponding to a photographing device of the training image through the device tracing network model according to the training pattern noise feature; and continuing to perform training after adjusting a parameter of the device tracing network model according to the device identifier label and the prediction device identifier, until a trained device tracing network model is obtained after the training is ended.

In this embodiment, the device tracing network model is trained through the training image, and device tracing processing on the face image is implemented through the trained device tracing network model, so that device tracing is performed on the face image based on the artificial intelligence technology, and the processing efficiency and accuracy of device tracing processing can be effectively improved.

Specifically, device tracing processing is implemented based on the device tracing network model, and the device tracing network model may be various neural network models such as a convolutional neural network (CNN), a recurrent neural network (RNN), or a deep neural network (DNN).

Further, the device tracing network model is generated through the model training operations. In event that the device tracing network model is trained, a training device end, for example, the verification device or the server obtains a training image carrying a device identifier label. The device identifier label records a photographing device identifier of a photographing device of the training image. The training device end performs device tracing processing on the training image through a to-be-trained device tracing network model, and specifically, performs at least one convolution operation on the training image through the to-be-trained device tracing network model, to obtain a training convolution feature of the training image; and then performs non-linear mapping on the training convolution feature through the device tracing network model to obtain a training pattern noise feature, where the training pattern noise feature reflects pattern noise of the photographing device of the training image obtained by device tracing processing performed by the device tracing network model on the training image. The training device end determines a prediction device identifier corresponding to the photographing device of the training image according to the training pattern noise feature through the device tracing network model, where the prediction device identifier is a result of device tracing processing performed by the to-be-trained device tracing network model on the training image. The training device end continues to perform training after adjusting a parameter of the device tracing network model according to the device identifier label and the prediction device identifier, for example, performs adjustment on the parameter of the device tracing network model according to a difference between the device identifier label and the prediction device identifier and performs repeated training, until a trained device tracing network model is obtained after the training is ended. For example, the training is ended when the difference between the device identifier label and the prediction device identifier remains unchanged or the difference is less than a preset difference threshold, to obtain the trained device tracing network model.

In an embodiment, the continuing to perform training after adjusting a parameter of the device tracing network model according to the device identifier label and the prediction device identifier includes: obtaining a distance loss between the device identifier label and the prediction device identifier; determining a gradient parameter of the distance loss; and adjusting the parameter of the device tracing network model according to the gradient parameter, and continuing to perform training according to the device tracing network model whose parameter is adjusted.

In this embodiment, in event that the parameter of the device tracing network model is adjusted according to the difference between the device identifier label and the prediction device identifier, a gradient parameter may be determined according to a distance loss between the device identifier label and the prediction device identifier, and the parameter of the device tracing network model is adjusted according to the gradient parameter. The distance loss represents a distance between the device identifier label and the prediction device identifier, and a greater distance loss indicates a greater difference between the device identifier label and the prediction device identifier, that is, a poorer effect of the device tracing network model. Specifically, the distance loss may adopt a mean square error loss, that is, the distance loss is obtained through a squared distance between the device identifier label and the prediction distance identifier. The gradient parameter may be determined according to a stochastic gradient descent algorithm. The stochastic gradient descent algorithm is a machine learning optimization algorithm and used for minimizing a training cost function during training, which can find an optimal parameter of a machine learning model.

Specifically, training continues to be performed after the parameter of the device tracing network model is adjusted according to the device identifier label and the prediction device identifier, and the training device end obtains the distance loss between the device identifier label and the prediction device identifier. For example, the distance loss may be calculated according to the squared distance between the device identifier label and the prediction device identifier. The training device end determines the gradient parameter of the distance loss, for example, calculates the gradient parameter of the distance loss based on the stochastic gradient descent algorithm. The training device end adjusts the parameter of the device tracing network model according to the gradient parameter, and continues to perform training according to the device tracing network model whose parameter is adjusted.

In an embodiment, the obtaining a verification device identifier corresponding to the verification device includes: obtaining a reference image photographed by the verification device; and performing artificial intelligence-based device tracing processing on the reference image, to obtain the verification device identifier corresponding to the verification device.

In this embodiment, the verification device identifier corresponding to the verification device is obtained by performing artificial intelligence-based device tracing processing on an image photographed by the verification device. Specifically, the verification device obtains the reference image photographed by the verification device. For example, the verification device may be triggered to perform photographing to obtain the reference image, and the reference image is photographed by the verification device. Therefore, device tracing may be performed on the reference image, to obtain the verification device identifier corresponding to the verification device. Further, the verification device performs artificial intelligence-based device tracing processing on the obtained reference image, where the device tracing processing is the same as the device tracing processing on the face image. For example, artificial intelligence-based device tracing processing is performed on the reference image through a pre-trained device tracing network model, to obtain the verification device identifier corresponding to the verification device. The verification device identifier may be used for distinguishing various verification devices.

Figure 5:
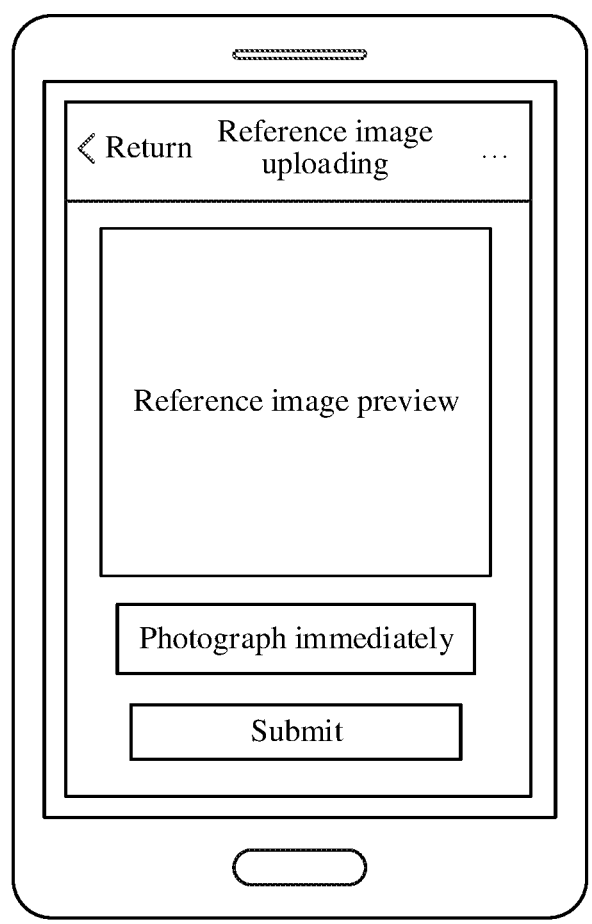
FIG. 5 is a schematic interface diagram of a reference image upload interface according to an embodiment.

During a specific implementation, as shown in FIG. 5, after the face image is uploaded, a reference image upload interface may be further entered, the verification device may be triggered to perform photographing through the interface, and the reference image photographed by the verification device is displayed in a predetermined preview region, so that artificial intelligence-based device tracing processing may be performed on the reference image after submission is triggered, to obtain the verification device identifier corresponding to the verification device.

In this embodiment, the verification device identifier corresponding to the verification device may be accurately obtained by performing artificial intelligence-based device tracing processing on the image photographed by the verification device, so that feature comparison is performed according to the verification device identifier and the photographing device identifier, to determine the authenticity and reliability of the face image inputted into the verification device, thereby ensuring the accuracy of identity verification.

In an embodiment, the performing identity verification based on the face image includes: obtaining a verification standard image; performing face comparison on the face image and the verification standard image, to obtain a face comparison result; and obtaining an identity verification result of the face image according to the face comparison result.

In this embodiment, face comparison is performed on a verification standard image used as an identity verification standard image and the face image, and an identity verification result is obtained according to a face comparison result. Specifically, the verification device obtains a verification standard image, where the verification standard image is an identity verification standard image, for example, may be an identification photograph of the user. The verification standard image may be inputted through the verification device, or may be obtained from the server. The verification device performs face comparison on the face image and the obtained verification standard image, for example, performs comparison on a face in the face image and a face in the verification standard image based on computer vision, to obtain a face comparison result. The verification device obtains an identity verification result of the face image according to the face comparison result. If the face comparison result indicates that the face image and the verification standard image include the face of a same user, the identity verification result may be a verification success; or otherwise, the identity verification result may be a verification failure.

In this embodiment, after determining that the face image is photographed by the verification device and is not an image illegally stolen from a network, face comparison is performed based on the face image and the verification standard image to implement identity verification. Therefore, a risk that an illegally stolen face image is used for identity verification can be effectively avoided, and the accuracy of identity verification is ensured.

In an embodiment, the artificial intelligence-based identity verification method further includes: in response to the comparison result indicating that the photographing device and the verification device are different devices, instructing the verification device to display a verification failure prompt message, and instructing the verification device to display prompt information describing that the face image is an illegal image.

In this embodiment, in event that the comparison result of the photographing device identifier and the verification device identifier indicates that the photographing device of the face image and the verification device are different, namely, the face image inputted into the verification device is not photographed by the verification device but may be an image illegally stolen from a network, a verification failure prompt message may be displayed through the verification device, and prompt information describing that the face image is an illegal image may be displayed.

Figure 6:
FIG. 6 is a schematic interface diagram of a verification result interface according to an embodiment.

Specifically, after the verification device performs feature comparison on the photographing device identifier and the verification device identifier to obtain a comparison result, in response to the comparison result indicating that the photographing device and the verification device are different devices, namely, the face image inputted into the verification device is not photographed by the verification device, and the authenticity and reliability thereof are limited, the verification device displays a verification failure prompt message and displays prompt information describing that the face image is an illegal image, to prompt the user to perform face image uploading again. In a specific application, as shown in FIG. 6, a verification failure and a verification failure prompt message may be displayed in a verification result interface of identity verification, to prompt the user to re-upload an authentic face image for identity verification.

In this embodiment, in response to determining that the photographing device of the face image and the verification device are different devices, a verification failure and a verification failure prompt message are displayed, to prompt the user to re-upload an authentic face image for identity verification, so that the accuracy of identity verification may be ensured.

Figure 7:
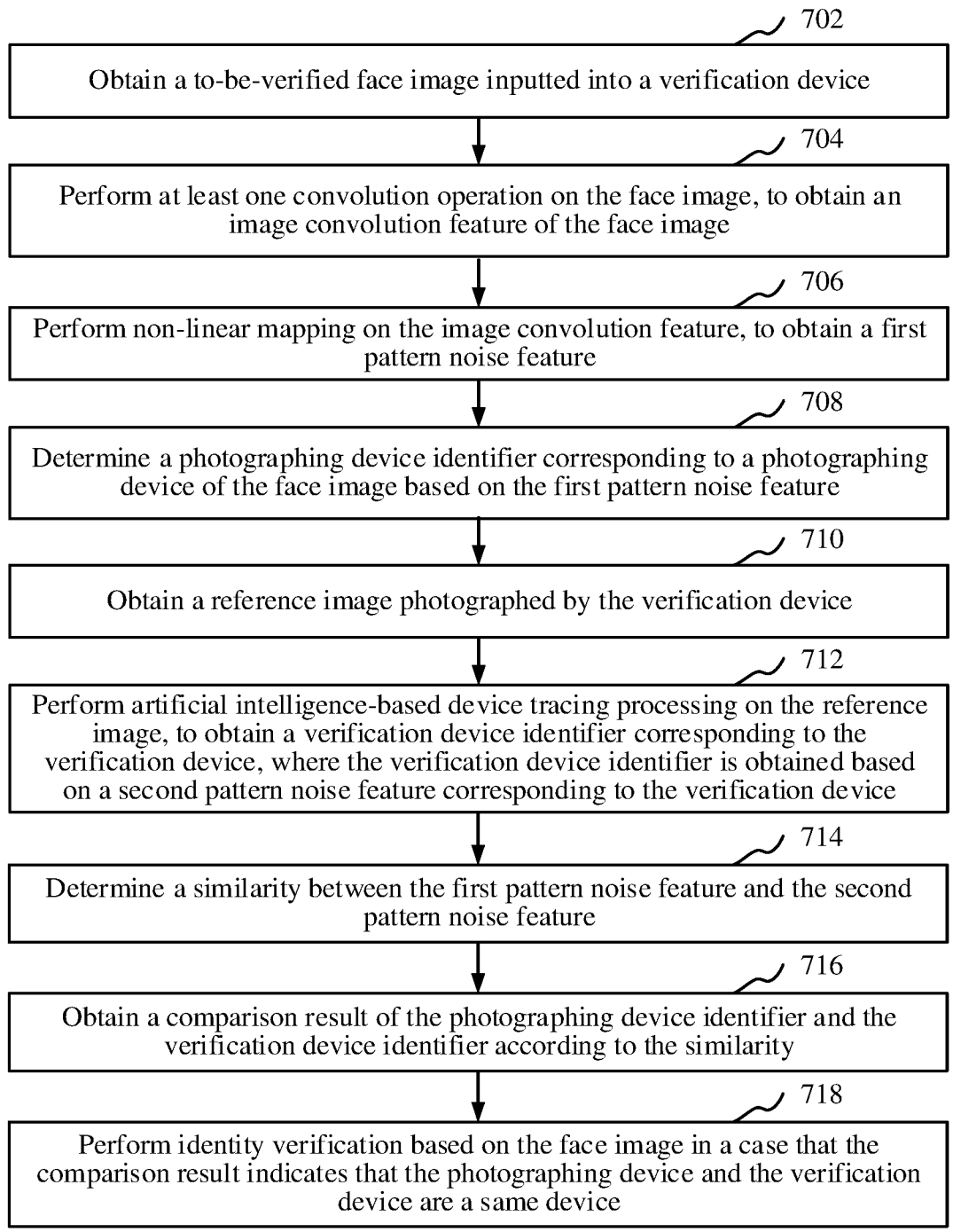
FIG. 7 is a schematic flowchart of an artificial intelligence-based identity verification method according to another embodiment.

In an embodiment, as shown in FIG. 7, an artificial intelligence-based identity verification method is provided, including the following steps:

Step 702: Obtain a to-be-verified face image inputted into a verification device.

The verification device is a terminal device on which the user initiates identity verification, the face image is inputted into the verification device, the face image includes face parts of the user, and identity verification may be performed on the face image by recognizing the face parts in the face image. The face image is inputted into the verification device for identity verification, and when the face image is an illegally stolen image, the accuracy of identity verification may be affected, leading to a potential safety hazard of identity verification.

Step 704: Perform at least one convolution operation on the face image, to obtain an image convolution feature of the face image.

The convolution operation is implemented by a convolution layer of a convolutional neural network model, to perform feature extraction on the face image, so that the image convolution feature representing pattern noise of a photographing device corresponding to the face image may be obtained.

Step 706: Perform non-linear mapping on the image convolution feature, to obtain a first pattern noise feature.

The verification device performs non-linear mapping on the obtained image convolution feature, specifically, may first perform pooling processing on the image convolution feature, and then perform non-linear mapping on an output result of the pooling through an excitation function, to obtain the first pattern noise feature representing the pattern noise of the photographing device of the face image.

Step 708: Determine a photographing device identifier corresponding to a photographing device of the face image based on the first pattern noise feature.

Specifically, the verification device may directly use the obtained first pattern noise feature as the photographing device identifier corresponding to the photographing device of the face image, or may perform label mapping on the first pattern noise feature, for example, perform label mapping through a fully-connected layer, to map the first pattern noise feature to a corresponding character string, obtain a device ID label according to the character string, and use the obtained device ID label as the photographing device identifier.

Step 710: Obtain a reference image photographed by the verification device.

The reference image is photographed by the verification device. Therefore, device tracing may be performed on the reference image, to obtain a verification device identifier corresponding to the verification device. The reference image may be a reference image pre-stored in the verification device during delivery, for example, may be a read-only and unchangeable reference image photographed by the verification device and pre-stored in secure storage of the verification device during delivery, so that the reference image may be obtained from the secure storage of the verification device, and it is ensured that the reference image is photographed by the verification device. In addition, the reference image may also be a photographed background image without a face corresponding to the face image. Further, the reference image may also be an officially authenticated image photographed by the verification device. For example, an official worker may authenticate the reference image, to ensure that the reference image is photographed by the verification device.

Step 712: Perform artificial intelligence-based device tracing processing on the reference image, to obtain a verification device identifier corresponding to the verification device, where the verification device identifier is obtained based on a second pattern noise feature corresponding to the verification device.

Specifically, artificial intelligence-based device tracing processing may be performed on the reference image through a pre-trained device tracing network model, to obtain the verification device identifier corresponding to the verification device, and the verification device identifier is used for distinguishing various verification devices.

Step 714: Determine a similarity between the first pattern noise feature and the second pattern noise feature.

The similarity represents a degree of similarity between the photographing device of the face image and the verification device, and a higher similarity indicates that the photographing device of the face image is more similar to the verification device, and the face image is more likely to be photographed by the verification device. Specifically, a cosine similarity between the first pattern noise feature and the second pattern noise feature may be determined, where the cosine similarity measures the similarity between the two parties by calculating a cosine value of an angle between the first pattern noise feature and the second pattern noise feature.

Step 716: Obtain a comparison result of the photographing device identifier and the verification device identifier according to the similarity.

The comparison result of the photographing device identifier and the verification device identifier is obtained based on the similarity between the first pattern noise feature and the second pattern noise feature. Specifically, the similarity may be compared with a preset similarity threshold. In event that the similarity exceeds the similarity threshold, it is considered that the similarity between the first pattern noise feature and the second pattern noise feature is relatively high, and the photographing device of the face image and the verification device are the same device; or otherwise, the photographing device of the face image and the verification device are different devices.

Step 718: Perform identity verification based on the face image in response to the comparison result indicating that the photographing device and the verification device are a same device.

Specifically, the verification device obtains a verification standard image, where the verification standard image is an identity verification standard image, for example, may be an identification photograph of the user. The verification standard image may be inputted through the verification device, or may be obtained from the server. The verification device performs face comparison on the face image and the obtained verification standard image, for example, performs comparison on a face in the face image and a face in the verification standard image based on computer vision, to obtain a face comparison result. The verification device obtains an identity verification result of the face image according to the face comparison result. If the face comparison result indicates that the face image and the verification standard image include the face of a same user, the identity verification result may be a verification success; or otherwise, the identity verification result may be a verification failure.

In this embodiment, at least one convolution operation is performed on the to-be-verified face image inputted into the verification device, non-linear mapping is performed on the obtained image convolution feature to obtain the first pattern noise feature, and the photographing device identifier corresponding to the photographing device of the face image is determined based on the first pattern noise feature. The reference image photographed by the verification device is obtained, and artificial intelligence-based device tracing processing is performed on the reference image to obtain the verification device identifier generated based on the second pattern noise feature corresponding to the verification device. The similarity between the first pattern noise feature and the second pattern noise feature is calculated, and a relationship between the photographing device and the verification device is determined according to the similarity to obtain the comparison result. In event that the comparison result indicates that the photographing device and the verification device are the same device, it indicates that the face image inputted into the verification device is photographed by the verification device, and the face image is authentic, so that identity verification is performed based on the face image. Artificial intelligence-based device tracing processing on the face image inputted into the verification device, feature comparison is performed on the obtained photographing device identifier corresponding to the photographing device of the face image and the verification device identifier of the verification device, and in response to determining that the photographing device of the face image is the verification device, identity verification is performed based on the face image, so that the authenticity and reliability of the face image inputted into the verification device are ensured, the accuracy of identity verification performed based on the face image is improved, and the safety of identity verification is ensured.

This application further provides an application scenario in which the foregoing artificial intelligence-based identity verification method is applicable. Specifically, an application of the artificial intelligence-based identity verification method in the application scenario is as follows:

In event that a verification device performs identity verification based on a face image, a face image inputted into the verification device is obtained, where the face image may be photographed by the verification device or may be an electronic picture photographed by another photographing device. Scaling processing is performed on the face image, to scale the face image into 224*224 pixels, and the scaled face image is inputted into a pre-trained CNN network, to extract a pattern noise feature of a sensor of a photographing device of the face image through the pre-trained CNN network, so that a picture photographing device ID is obtained, and whether the face image is photographed by the verification device is determined according to the picture photographing device ID. Generally, image obtaining sensors of different photographing devices generate sensor pattern noise during production, and the sensor pattern noise of different devices differs, which is reflected in pictures. That is, pictures photographed by different devices have a difference in pixels. According to the difference, different devices may be distinguished according to the pictures, so that a device ID is obtained, and photographing device ID tracing on the image is implemented.

Figure 8:
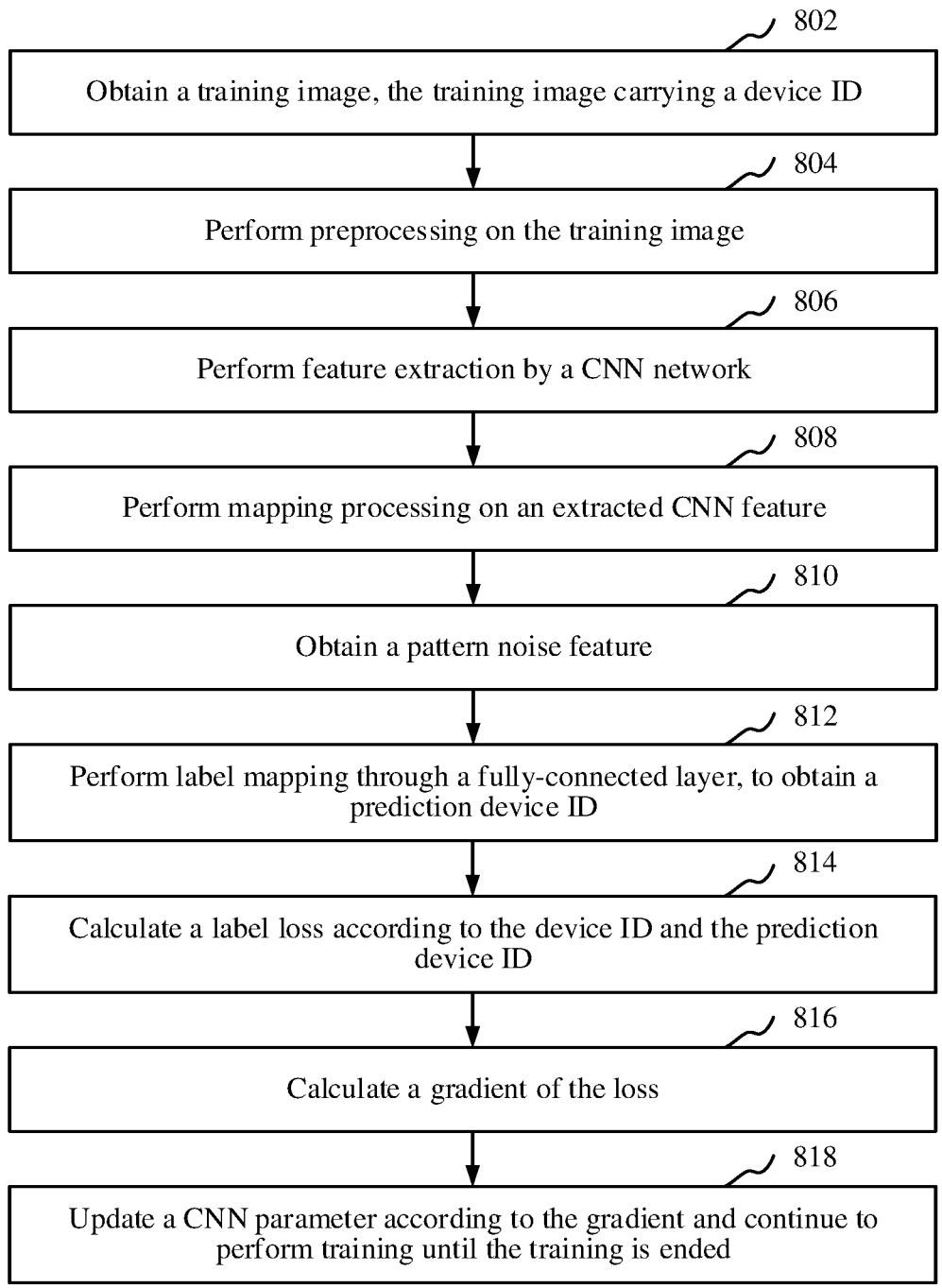
FIG. 8 is a schematic flowchart of network training according to an embodiment.

When the CNN network is trained, as shown in FIG. 8, the following steps are included:

Step 802: Obtain a training image, the training image carrying a device ID.

The training image is an electronic picture photographed by each photographing device, and the device ID is an identifier of a real photographing device corresponding to each training image.

Step 804: Perform preprocessing on the training image.

The preprocessing specifically may be uniformly scaling the training image into 224*224 pixels.

Step 806: Perform feature extraction by a CNN network.

Feature extraction is performed on the scaled training image through a convolution layer of the CNN network, where the CNN network is a multi-layer feedforward artificial neural network represented by features extracted from original data, and the CNN network may extract a feature corresponding to the picture through sliding convolution.

Step 808: Perform mapping processing on an extracted CNN feature.

Max pooling is performed on the feature obtained through extraction in step 806, and mapping processing is performed through an excitation function RELU, to enhance the representation capability of the feature.

Step 810: Obtain a pattern noise feature.

A pattern noise feature corresponding to the training image is obtained according to a mapping processing result in step 808. During a specific implementation, step 806 and step 808 may be performed repeatedly for a plurality of times, to extract a deeper feature in the training image.

Step 812: Perform label mapping through a fully-connected layer, to obtain a prediction device ID.

Figure 9:
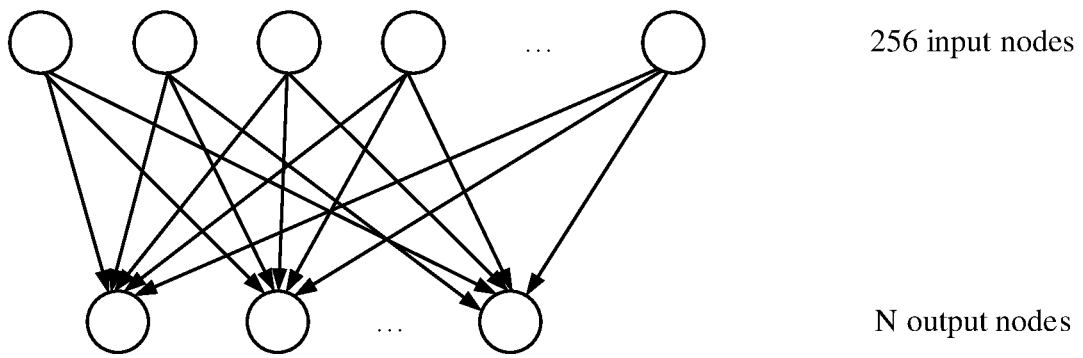
FIG. 9 is a schematic structural diagram of a fully-connected layer according to the embodiment shown in FIG. 8.

The CNN is a multi-layer neural network, a 1*256-dimensional device pattern noise feature may be obtained after feature extraction-feature processing operations of the plurality of layers, and a device ID, namely, an output label, of the inputted picture is predicted according to the feature through a fully-connected layer. A structural diagram of the fully-connected layer is shown in FIG. 9, where 256 input nodes indicate 256-dimensional pattern noise features, n output nodes indicate n device IDs, and a node with a greatest median of the output nodes may be used as a device ID corresponding to the currently inputted picture.

Step 814: Calculate a label loss according to the device ID and the prediction device ID.

A distance between the device ID and the prediction device ID is compared, where a greater distance indicates a greater loss and indicates a greater difference between the prediction device ID and the real device ID. For example, a mean square error loss may be adopted. A mean square error is a measurement unit reflecting a degree of difference between an estimator and an estimand. Specifically, the label loss may be obtained by calculating a squared distance between the device ID and the prediction device ID.

Step 816: Calculate a gradient of the loss.

The gradient of the label loss is determined based on the device ID and the prediction device ID. Specifically, the gradient of the label loss may be calculated according to gradient descent. The gradient descent is widely applied in machine learning, and no matter is linear regression or Logistic regression, a main objective thereof is to find a minimum value or converge to a minimum value of a target function through iterations. Further, the obtained gradient of the label loss is determined, a local minimum value is determined in a direction reverse to the gradient, and a minimum value of the label loss is obtained by performing gradient descent iterative calculation according to a predetermined step length.

Step 818: Update a CNN parameter according to the gradient and continue to perform training until the training is ended.

The CNN parameter is updated according to the gradient of the label loss and training continues to be performed until the training is ended. For example, if losses of the device ID and the prediction device ID are consistent or the distance remains unchanged, a trained CNN network may be obtained, and the CNN network may perform device tracing processing on the inputted picture, to obtain a photographing device identifier of a photographing device of the inputted picture.

A face verification device ID is obtained. An obtaining principle of the face verification device ID and an obtaining principle of the picture photographing device ID are the same, and a difference lies in that the verification device photographs a background picture without a face, then inputs the photographed background picture into the CNN network to perform device tracing processing, to obtain a pattern noise feature of a device currently executing face verification and determine the face verification device ID according to the pattern noise feature.

After the picture photographing device ID and the face verification device ID are obtained, the picture photographing device ID and the face verification device ID are compared. For example, a cosine similarity between the 256-dimensional pattern noise feature obtained in the device tracing processing may be calculated, and when the similarity is greater than a specific threshold, it may be considered that the two IDs represent a same device, and identity verification may be performed based on the face image; and when the similarity is less than the specific threshold, it is considered that the two IDs represent different devices, which indicates that the picture currently used for face verification is not photographed by the device currently executing face verification but a stolen picture, so that a verification failure identity verification result may be outputted. Device tracing processing is performed on the face image through the CNN network, to determine whether the face image is photographed by the verification device, so that the authenticity and reliability of the face image may be ensured, and the accuracy of identity verification is improved.

It is to be understood that, although the steps in the flowcharts of FIG. 2, FIG. 4, and FIG. 7 and FIG. 8 are sequentially displayed according to indication of arrows, the steps are not necessarily sequentially performed in the sequence indicated by the arrows. Unless clearly specified in this specification, there is no strict sequence limitation on the execution of the steps, and the steps may be performed in another sequence. Moreover, at least a part of the steps in FIG. 2, FIG. 4, and FIG. 7 and FIG. 8 may include a plurality of substeps or a plurality of stages. These substeps or stages are not necessarily executed at the same time, but may be executed at different times. The sequence of execution of these substeps or stages is not necessarily performed sequentially, but may be performed in turn or alternately with other steps or at least a part of substeps or stages of the other steps.

Figure 10:
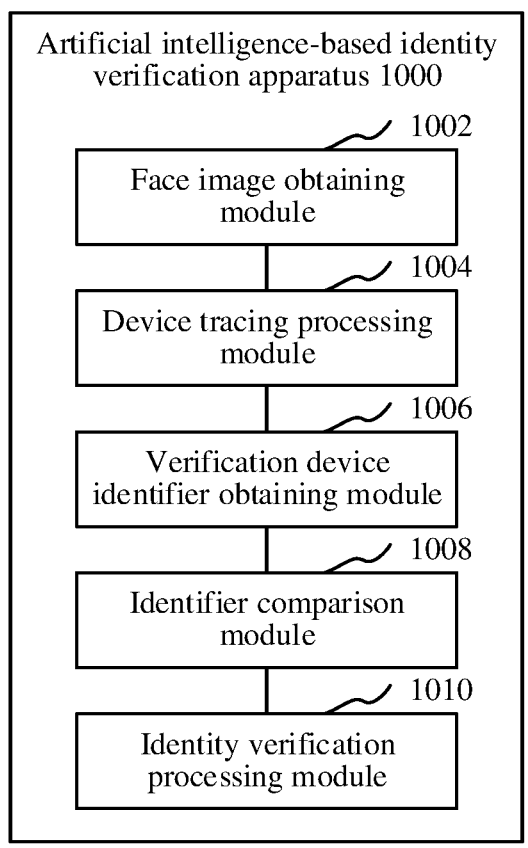
FIG. 10 is a structural block diagram of an artificial intelligence-based identity verification apparatus according to an embodiment.

In an embodiment, as shown in FIG. 10, an artificial intelligence-based identity verification apparatus 1000 is provided. The apparatus may use a software module or a hardware module, or a combination thereof to become a part of a computer device. The apparatus specifically includes: a face image obtaining module 1002, a device tracing processing module 1004, a verification device identifier obtaining module 1006, an identifier comparison module 1008, and an identity verification processing module 1010.

The face image obtaining module 1002 is configured to obtain a to-be-verified face image inputted into a verification device.

The device tracing processing module 1004 is configured to perform artificial intelligence-based device tracing processing on the face image, to obtain a photographing device identifier corresponding to a photographing device of the face image.

The verification device identifier obtaining module 1006 is configured to obtain a verification device identifier corresponding to the verification device.

The identifier comparison module 1008 is configured to perform feature comparison on the photographing device identifier and the verification device identifier to obtain a comparison result.

The identity verification processing module 1010 is configured to perform identity verification based on the face image in response to the comparison result indicating that the photographing device and the verification device are a same device.

In an embodiment, the photographing device identifier is obtained based on a first pattern noise feature extracted from the face image, and the verification device identifier is obtained based on a second pattern noise feature corresponding to the verification device; and the identifier comparison module 1008 includes a similarity determining module and a comparison result obtaining module, where the similarity determining module is configured to determine a similarity between the first pattern noise feature and the second pattern noise feature; and the comparison result obtaining module is configured to obtain the comparison result of the photographing device identifier and the verification device identifier according to the similarity.

In an embodiment, the comparison result obtaining module includes a first comparison result module and a second comparison result module, where the first comparison result module is configured to obtain a comparison result indicating that the photographing device and the verification device are a same device in a case that the similarity is greater than a similarity threshold; and the second comparison result module is configured to obtain a comparison result indicating that the photographing device and the verification device are different devices when the similarity is less than or equal to the similarity threshold.

In an embodiment, the device tracing processing module 1004 includes a convolution feature extraction module, a noise feature obtaining module, and a photographing device identifier determining module. The convolution feature extraction module is configured to perform at least one convolution operation on the face image, to obtain a first image convolution feature of the face image. The noise feature obtaining module is configured to perform non-linear mapping on the first image convolution feature, to obtain the first pattern noise feature. The photographing device identifier determining module is configured to determine the photographing device identifier corresponding to the photographing device of the face image based on the first pattern noise feature.

In an embodiment, the photographing device identifier determining module includes a character string mapping module, configured to map the first pattern noise feature into a character string according to a device identifier format, to obtain the photographing device identifier corresponding to the photographing device of the face image; and the identifier comparison module 1008 is further configured to perform character comparison on the photographing device identifier and the verification device identifier to obtain the comparison result.

In an embodiment, the device tracing processing is implemented based on a device tracing network model, the device tracing network model is generated through a model training apparatus, and the model training apparatus includes a training image obtaining module, a convolution training processing module, a mapping training processing module, a device identifier predicting module, and a parameter updating module. The training image obtaining module is configured to obtain a training image carrying a device identifier label. The convolution training processing module is configured to perform at least one convolution operation on the training image through a to-be-trained device tracing network model, to obtain a training convolution feature of the training image. The mapping training processing module is configured to perform non-linear mapping on the training convolution feature through the device tracing network model, to obtain a training pattern noise feature. The device identifier predicting module is configured to determine a prediction device identifier corresponding to a photographing device of the training image through the device tracing network model according to the training pattern noise feature. The parameter updating module is configured to continue to perform training after adjusting a parameter of the device tracing network model according to the device identifier label and the prediction device identifier, until a trained device tracing network model is obtained after the training is ended.

In an embodiment, the parameter updating module includes a loss determining module, a gradient determining module, and a parameter adjustment module. The loss determining module is configured to obtain a distance loss between the device identifier label and the prediction device identifier. The gradient determining module is configured to determine a gradient parameter of the distance loss. The parameter adjustment module is configured to adjust the parameter of the device tracing network model according to the gradient parameter, and continue to perform training according to the device tracing network model whose parameter is adjusted.

In an embodiment, the verification device identifier obtaining module 1006 includes a reference image obtaining module and a verification device tracing module. The reference image obtaining module is configured to obtain a reference image photographed by the verification device. The verification device tracing module is configured to perform artificial intelligence-based device tracing processing on the reference image, to obtain the verification device identifier corresponding to the verification device.

In an embodiment, the identity verification processing module 1010 includes a standard image obtaining module, a face comparison module, and a verification result obtaining module. The standard image obtaining module is configured to obtain a verification standard image. The face comparison module is configured to perform face comparison on the face image and the verification standard image, to obtain a face comparison result. The verification result obtaining module is configured to obtain an identity verification result of the face image according to the face comparison result.

In an embodiment, the artificial intelligence-based identity verification apparatus further includes a verification result display module, configured to: in response to the comparison result indicating that the photographing device and the verification device are different devices, instruct the verification device to display a verification failure prompt message, and instructing the verification device to display prompt information describing that the face image is an illegal image.

In the foregoing artificial intelligence-based identity verification apparatus, artificial intelligence-based device tracing processing is performed on the face image inputted into the verification device, the photographing device identifier corresponding to the photographing device of the face image is obtained, in response to the comparison result of the photographing device identifier and the verification device identifier of the verification device indicating that the photographing device and the verification device are the same device, the face image inputted into the verification device is determined to be authentic, and identity verification is performed based on the face image. Artificial intelligence-based device tracing processing on the face image inputted into the verification device, feature comparison is performed on the obtained photographing device identifier corresponding to the photographing device of the face image and the verification device identifier of the verification device, and in response to determining that the photographing device of the face image is the verification device, identity verification is performed based on the face image, so that the authenticity and reliability of the face image inputted into the verification device are ensured, the accuracy of identity verification performed based on the face image is improved, and the safety of identity verification is ensured.

For a specific limitation to the artificial intelligence-based identity verification apparatus, reference may be made to the limitation to the artificial intelligence-based identity verification method described above. The modules in the foregoing artificial intelligence-based identity verification apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 11. The computer device includes a processor, a memory, a communication interface, a display screen, and an input apparatus that are connected through a system bus. The processor of the terminal is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured to communicate with an external terminal in a wired or wireless manner. The wireless communication may be implemented by WI-FI, an operator network, near field communication (NFC), or other technologies. When executed by the processor, the computer-readable instructions implement an artificial intelligence-based identity verification method. The display screen of the computer device may be a liquid crystal display screen or an electronic ink display screen. The input apparatus of the computer device may be a touch layer covering the display screen, or may be a key, a trackball, or a touch pad arranged on a housing of the computer device, and may further be an external keyboard, a touch pad, or a mouse.

Figure 11:
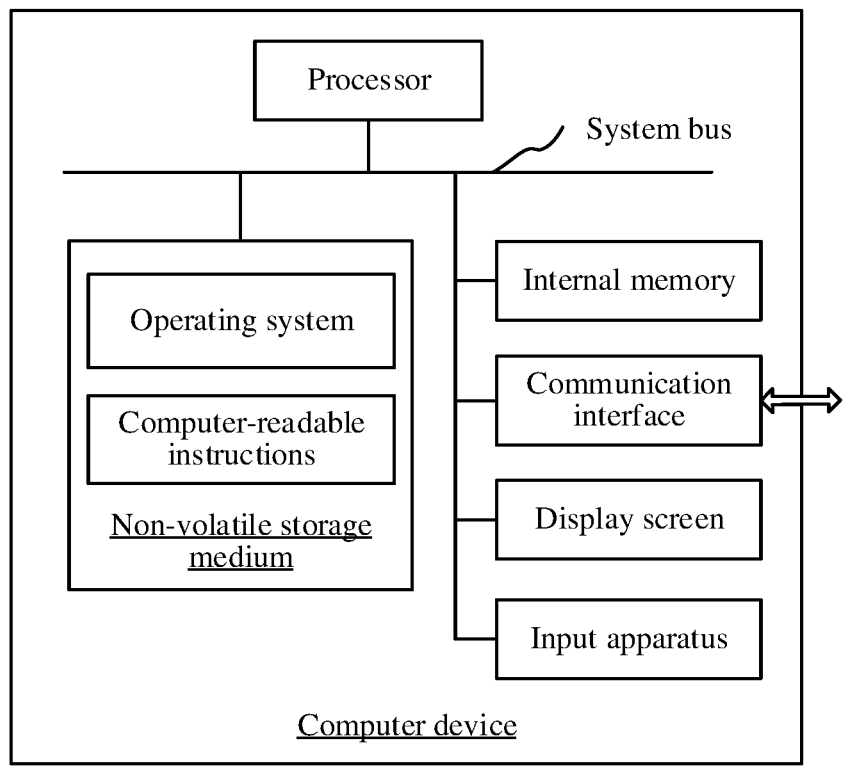
FIG. 11 is an internal structure diagram of a computer device according to an embodiment.

A person skilled in the art may understand that, the structure shown in FIG. 11 is only a block diagram of a part of a structure related to a solution of this application and does not limit the computer device to which the solution of this application is applicable. Specifically, the computer device may include more or fewer components than those shown in the figure, or some components may be combined, or a different component deployment may be used.

In an embodiment, a computer device is further provided, including a memory and one or more processors, where the memory stores computer-readable instructions, and the one or more processors implement the steps in the foregoing method embodiments when executing the computer-readable instructions.

In an embodiment, one or more non-volatile computer-readable storage media are provided, storing computer-readable instructions, the computer-readable instructions, when executed by one or more processors, implementing the steps in the foregoing method embodiments.

In an embodiment, a computer-readable program product or a computer-readable program is provided, the computer-readable program product or the computer-readable program including computer instructions, and the computer instructions being stored in a computer-readable storage medium. A processor of a computer device reads the computer instructions from the computer-readable storage medium and executes the computer instructions to cause the computer device to perform the steps in the foregoing method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, or an optical memory. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be combined in different ways to form other additional embodiments. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of the present disclosure. A person of ordinary skill in the art may further make several variations and improvements without departing from the concept of this application, and such variations and improvements all fall within the protection scope of this application. Therefore, the protection scope of the patent of this application shall be subject to the appended claims.

What is claimed is:

1. An artificial intelligence-based identity verification method, performed by a verification device, the method comprising:
   obtaining a to-be-verified face image inputted into the verification device;
   performing at least one convolution operation on the face image, to obtain an image convolution feature of the face image;
   performing non-linear mapping on the image convolution feature, to obtain a first pattern noise feature;
   performing artificial intelligence-based device tracing processing on the face image, to obtain a photographing device identifier corresponding to a photographing device of the face image based on the first pattern noise feature extracted from the face image;
   obtaining a verification device identifier corresponding to the verification device based on a second pattern noise feature corresponding to the verification device;
   determining a similarity between the first pattern noise feature and the second pattern noise feature;

performing feature comparison on the photographing device identifier and the verification device identifier to obtain a comparison result according to the similarity; and performing identity verification based on the face image in response to the comparison result indicating that the photographing device and the verification device are a same device.

2. The method according to claim 1, wherein the obtaining the comparison result of the photographing device identifier and the verification device identifier according to the similarity comprises:

obtaining a comparison result indicating that the photographing device and the verification device are a same device in response to the similarity being greater than a similarity threshold; and obtaining a comparison result indicating that the photographing device and the verification device are different devices in response to the similarity being less than or equal to the similarity threshold.

3. The method according to claim 1, wherein the performing non-linear mapping on the image convolution feature, to obtain the first pattern noise feature comprises:

performing pooling processing on the image convolution feature, to obtain an output result of the pooling; and performing non-linear mapping on the output result of the pooling through an excitation function, to obtain the first pattern noise feature.

4. The method according to claim 1, wherein the determining the photographing device identifier corresponding to the photographing device of the face image based on the first pattern noise feature comprises:

mapping the first pattern noise feature into a character string according to a device identifier format, to obtain the photographing device identifier corresponding to the photographing device of the face image; and the performing feature comparison on the photographing device identifier and the verification device identifier to obtain a comparison result comprises:

performing character comparison on the photographing device identifier and the verification device identifier to obtain the comparison result.

5. The method according to claim 1, wherein the device tracing processing is implemented based on a device tracing network model, the device tracing network model is generated through model training operations, and the model training operations comprise:

obtaining a training image carrying a device identifier label;

performing at least one convolution operation on the training image through a to-be-trained device tracing network model, to obtain a training convolution feature of the training image;

performing non-linear mapping on the training convolution feature through the device tracing network model, to obtain a training pattern noise feature;

determining a prediction device identifier corresponding to a photographing device of the training image through the device tracing network model according to the training pattern noise feature; and continuing to perform training after adjusting a parameter of the device tracing network model according to the device identifier label and the prediction device identifier, until a trained device tracing network model is obtained after the training is ended.

6. The method according to claim 5, wherein the continuing to perform training after adjusting a parameter of the device tracing network model according to the device identifier label and the prediction device identifier comprises:

obtaining a distance loss between the device identifier label and the prediction device identifier;

determining a gradient parameter of the distance loss; and adjusting the parameter of the device tracing network model according to the gradient parameter, and continuing to perform training according to the device tracing network model whose parameter is adjusted.

7. The method according to claim 1, wherein the obtaining a verification device identifier corresponding to the verification device comprises:

obtaining a reference image photographed by the verification device; and performing artificial intelligence-based device tracing processing on the reference image, to obtain the verification device identifier corresponding to the verification device.

8. The method according to claim 1, wherein the performing identity verification based on the face image comprises:

obtaining a verification standard image;

performing face comparison on the face image and the verification standard image, to obtain a face comparison result; and obtaining an identity verification result of the face image according to the face comparison result.

9. The method according to claim 1, wherein the method further comprises:

in response to the comparison result indicating that the photographing device and the verification device are different devices, instructing the verification device to display a verification failure prompt message, and instructing the verification device to display prompt information describing that the face image is an illegal image.

10. An artificial intelligence-based identity verification apparatus, the apparatus comprising:

a memory storing a plurality of instructions; and a processor configured to execute the plurality of instructions, and upon execution of the plurality of instructions, is configured to:

obtain a to-be-verified face image inputted into a verification device;

perform artificial intelligence-based device tracing processing on the face image, to obtain a photographing device identifier corresponding to a photographing device of the face image, wherein the device tracing processing is implemented based on a device tracing network model, the device tracing network model is generated through a model training operations, and the model training operations comprise:

an operation to obtain a training image carrying a device identifier label;

an operation to perform at least one convolution operation on the training image through a to-be-trained device tracing network model, to obtain a training convolution feature of the training image;

an operation to perform non-linear mapping on the training convolution feature through the device tracing network model, to obtain a training pattern noise feature;

an operation to determine a prediction device identifier corresponding to a photographing device of the training image through the device tracing network model according to the training pattern noise feature; and an operation to continue to perform training after adjusting a parameter of the device tracing network model according to the device identifier label and the prediction device identifier, until a trained device tracing network model is obtained after the training is ended;

obtain a verification device identifier corresponding to the verification device;

perform feature comparison on the photographing device identifier and the verification device identifier to obtain a comparison result; and identity verification based on the face image in response to the comparison result indicating that the photographing device and the verification device are a same device.

11. The apparatus according to claim 10, wherein the photographing device identifier is obtained based on a first pattern noise feature extracted from the face image, and the verification device identifier is obtained based on a second pattern noise feature corresponding to the verification device; and wherein in order to perform the feature comparison, the processor, upon execution of the plurality of instructions, is configured to:

determine a similarity between the first pattern noise feature and the second pattern noise feature; and obtain the comparison result of the photographing device identifier and the verification device identifier according to the similarity.

12. The apparatus according to claim 11, wherein in order to perform the artificial intelligence-based device tracing processing on the face image, the processor, upon execution of the plurality of instructions, is configured to:

perform at least one convolution operation on the face image, to obtain a first image convolution feature of the face image;

perform non-linear mapping on the first image convolution feature, to obtain the first pattern noise feature; and determine the photographing device identifier corresponding to the photographing device of the face image based on the first pattern noise feature.

13. The apparatus according to claim 12, wherein:

in order to determine the photographing device identifier corresponding to the photographing device of the face image based on the first pattern noise feature, the processor, upon execution of the plurality of instructions, is configured to: map the first pattern noise feature into a character string according to a device identifier format, to obtain the photographing device identifier corresponding to the photographing device of the face image; and in order to perform feature comparison on the photographing device identifier and the verification device identifier to obtain the comparison result, the processor, upon execution of the plurality of instructions, is configured to: perform character comparison on the photographing device identifier and the verification device identifier to obtain the comparison result.

14. The apparatus according to claim 10, wherein the operation to continue to perform training comprises:

an operation to obtain a distance loss between the device identifier label and the prediction device identifier;

an operation to determine a gradient parameter of the distance loss; and an operation to adjust the parameter of the device tracing network model according to the gradient parameter, and continue to perform training according to the device tracing network model whose parameter is adjusted.

15. The apparatus according to claim 10, wherein in order to obtain the verification device identifier, the processor, upon execution of the plurality of instructions, is configured to:

obtain a reference image photographed by the verification device; and perform artificial intelligence-based device tracing processing on the reference image, to obtain the verification device identifier corresponding to the verification device.

16. The apparatus according to claim 10, wherein, in response to the comparison result indicating that the photographing device and the verification device are different devices, the processor, upon execution of the plurality of instructions, is configured to:

instruct the verification device to display a verification failure prompt message; and instruct the verification device to display prompt information describing that the face image is an illegal image.

17. The apparatus according to claim 10, wherein, in order to obtain a verification device identifier corresponding to the verification device, the processor, upon execution of the plurality of instructions, is configured to:

obtain a reference image photographed by the verification device; and perform artificial intelligence-based device tracing processing on the reference image, to obtain the verification device identifier corresponding to the verification device.

18. The apparatus according to claim 10, wherein to perform identity verification based on the face image, the processor, upon execution of the plurality of instructions, is configured to:

obtain a verification standard image;

perform face comparison on the face image and the verification standard image, to obtain a face comparison result; and obtain an identity verification result of the face image according to the face comparison result.

19. A non-transitory computer-readable storage medium storing a plurality of computer-readable instructions, the plurality of computer-readable instructions, when executed by a processor, is configured to cause the processor to:

obtain a to-be-verified face image inputted into a verification device;

perform at least one convolution operation on the face image, to obtain a first image convolution feature of the face image;

perform non-linear mapping on the first image convolution feature, to obtain a first pattern noise feature;

perform artificial intelligence-based device tracing processing on the face image, to obtain a photographing device identifier corresponding to a photographing device of the face image based on the first pattern noise feature;

obtain a verification device identifier corresponding to the verification device based on a second pattern noise feature corresponding to the verification device;

determine a similarity between the first pattern noise feature and the second pattern noise feature;

perform feature comparison on the photographing device identifier and the verification device identifier to obtain a comparison result according to the similarity; and identity verification based on the face image in response to the comparison result indicating that the photographing device and the verification device are a same device.

20. The non-transitory computer readable storage medium of claim 19, wherein the device tracing processing is implemented based on a device tracing network model, the device tracing network model is generated through a model training operations, and the model training operations comprise:
- an operation to obtain a training image carrying a device identifier label;
- an operation to perform at least one convolution operation on the training image through a to-be-trained device tracing network model, to obtain a training convolution feature of the training image;
- an operation to perform non-linear mapping on the training convolution feature through the device tracing network model, to obtain a training pattern noise feature;
- an operation to determine a prediction device identifier corresponding to a photographing device of the training image through the device tracing network model according to the training pattern noise feature; and
- an operation to continue to perform training after adjusting a parameter of the device tracing network model according to the device identifier label and the prediction device identifier, until a trained device tracing network model is obtained after the training is ended.

* * * * *